United States Patent
Wang et al.

(10) Patent No.: US 8,532,414 B2
(45) Date of Patent: Sep. 10, 2013

(54) REGION-OF-INTEREST VIDEO QUALITY ENHANCEMENT FOR OBJECT RECOGNITION

(75) Inventors: Hongcheng Wang, Vernon, CT (US); Zhen Jia, Shanghai (CN); Lei Sun, Shanghai (CN)

(73) Assignee: UTC Fire & Security Corporation, Farmington, CT (US)

( * ) Notice: Subject to any disclaimer, the term of this patent is extended or adjusted under 35 U.S.C. 154(b) by 73 days.

(21) Appl. No.: 13/256,889

(22) PCT Filed: Mar. 17, 2009

(86) PCT No.: PCT/US2009/001683
§ 371 (c)(1), (2), (4) Date: Sep. 15, 2011

(87) PCT Pub. No.: WO2010/107411
PCT Pub. Date: Sep. 23, 2010

(65) Prior Publication Data
US 2012/0008832 A1    Jan. 12, 2012

(51) Int. Cl.
*G06K 9/46*    (2006.01)
*G06K 9/00*    (2006.01)
*H04N 7/12*    (2006.01)

(52) U.S. Cl.
USPC ....... 382/239; 382/243; 382/103; 375/240.24

(58) Field of Classification Search
USPC .................. 382/103, 173, 219, 224, 232, 233, 382/239, 243, 251, 254, 275; 375/240.04, 375/240.24
See application file for complete search history.

(56) References Cited

U.S. PATENT DOCUMENTS

| 6,862,372 | B2  |   | 3/2005  | Yang et al. |         |
|-----------|-----|---|---------|-------------|---------|
| 7,433,533 | B2  | * | 10/2008 | Qin         | 382/254 |
| 7,529,422 | B2  | * | 5/2009  | Wang et al. | 382/254 |
| 7,620,208 | B2  | * | 11/2009 | Zhu et al.  | 382/104 |
| 2002/0122603 | A1 |   | 9/2002  | Boroczky et al. |     |
| 2004/0013315 | A1 | * | 1/2004  | Li et al.   | 382/268 |

(Continued)

FOREIGN PATENT DOCUMENTS
JP    2006074114 A    3/2006

OTHER PUBLICATIONS

Watson, A. B., Hu, J., & McGowan, J. F., III. (2001). Digital video quality metric based on human vision. Journal of Electronic Imaging, 10(1), 20-29.*
Wang et al., Fast Image/Video Contrast Enhancement Based on WTHE, Department of Electrical & Computer Engineering, University of British Columbia, Vancouver, Canada.

(Continued)

*Primary Examiner* — Andrae S Allison
(74) *Attorney, Agent, or Firm* — MH2 Technology Law Group LLP

(57) ABSTRACT

A video-based object recognition system and method provides selective, local enhancement of image data for improved object-based recognition. A frame of video data is analyzed to detect objects to receive further analysis, these local portions of the frame being referred to as a region of interest (ROI). A video quality metric (VQM) value is calculated locally for each ROI to assess the quality of the ROI. Based on the VQM value calculated with respect to the ROI, a particular video quality enhancement (VQE) function is selected and applied to the ROI to cure deficiencies in the quality of the ROI. Based on the enhanced ROI, objects within the defined region can be accurately identified.

10 Claims, 2 Drawing Sheets

(56) References Cited

U.S. PATENT DOCUMENTS

| | | |
|---|---|---|
| 2004/0175056 A1* | 9/2004 | Lee .............................. 382/286 |
| 2005/0030302 A1 | 2/2005 | Nishi et al. |
| 2006/0045381 A1* | 3/2006 | Matsuo et al. ................ 382/276 |
| 2006/0050795 A1 | 3/2006 | Boroczky et al. |
| 2006/0072844 A1* | 4/2006 | Wang et al. ................... 382/254 |
| 2008/0129844 A1* | 6/2008 | Cusack et al. ................ 348/241 |
| 2008/0226192 A1 | 9/2008 | Silverstein et al. |
| 2009/0034791 A1* | 2/2009 | Doretto et al. ............... 382/103 |
| 2009/0274390 A1* | 11/2009 | Meur et al. ................... 382/275 |

OTHER PUBLICATIONS

Wang et al., Foveated Wavelet Image Quality Index, The University of Texas at Austin, Austin Texas, Watson Research Center, Yorktown Heights, New York.

Wang et al., Image Quality Assessment: From Error Visibility to Structural Similarity, Apr. 2004, pp. 600-612, IEEE Transactions on Image Processing, vol. 13.

The International Preliminary Report on Patentability in counterpart Foreign Application No. PCT/US2009/001683 filed Mar. 17, 2009.

* cited by examiner

REGION-OF-INTEREST VIDEO QUALITY ENHANCEMENT FOR OBJECT RECOGNITION

BACKGROUND

The present invention relates generally to image processing and computer vision, and in particular to video analysis for enhanced object recognition.

Image processing and computer vision methods are employed in a variety of applications to automatically gather information from video data. Video surveillance is an example of an application that is particularly well-suited for image processing and computer vision methods. Typical video surveillance includes a plurality of video cameras positioned throughout a building and/or region communicating video data to a monitoring station. Manual analysis of the video data requires continual monitoring of the video data by an actual person.

Image processing and computer vision provides an alternative to manual monitoring of video data. This is a difficult task, as the image processing and computer vision methods are in essence trying to replicate the processes by which an actual person makes sense of a series of images. Object recognition is one such task. For instance, an actual person (e.g., security guard) reviewing video data is able to identify a face as an object of interest and recognize the person based on his or her facial features. To perform the same function, computer vision methods must first recognize the face as a region of interest, and then apply a facial recognition algorithm that is able to accurately distinguish the identity of the person.

The accuracy of image processing and computer vision methods are thus related to the quality of the video data being analyzed. Prior art methods of enhancing video quality include the use of video enhancement functions. However, most video enhancement functions employed by the prior art apply a particular video quality enhancement to an entire image (i.e., applied globally). Other prior art methods may apply a video enhancement algorithm to a detected local object, but the same type of enhancement is applied regardless of any particular deficiencies associated with the local object. For example, in face recognition, a common practice is to use a contrast enhancement algorithm to enhance a locally detected facial image, wherein classifiers employ the enhanced facial for facial recognition. This scheme may work well for static images in which deficiencies associated with the image are likely to be improved by contrast enhancement. However, images blurred due to motion will not benefit from the contrast enhancement. Oftentimes, the applied video quality enhancement does not improve the quality of the image for object recognition purposes, or does not improve the quality of the image related to the object to be analyzed and recognized.

SUMMARY

A video-based object recognition system provides selective, local enhancement of image data for improved object-based recognition. The system includes an object detection module that identifies objects of interest within a frame of image data and selects a region of interest (ROI) that encompasses and includes the identified object. A video quality metric (VQM) module calculates a VQM metric for the selected ROI. Based on the calculated VQM metric, a video quality enhancement (VQE) module selects a VQE function to apply to the defined ROI. The enhanced ROI is provided to an object recognition module, which applies an object recognition algorithm to the enhanced ROI to identify objects within the frame of image data.

DETAILED DESCRIPTION

The present invention provides a system and method for selective, local enhancement of images for object recognition. The system receives incoming image data and detects within each image objects (e.g., faces, license plates, etc.) to be analyzed with object recognition algorithms. Before applying object recognition algorithms, however, the system defines regions-of-interest (ROI) around the detected object, and provides selective, local enhancement to the defined ROI to improve the image quality in a way that will improve object recognition.

Figure 1:
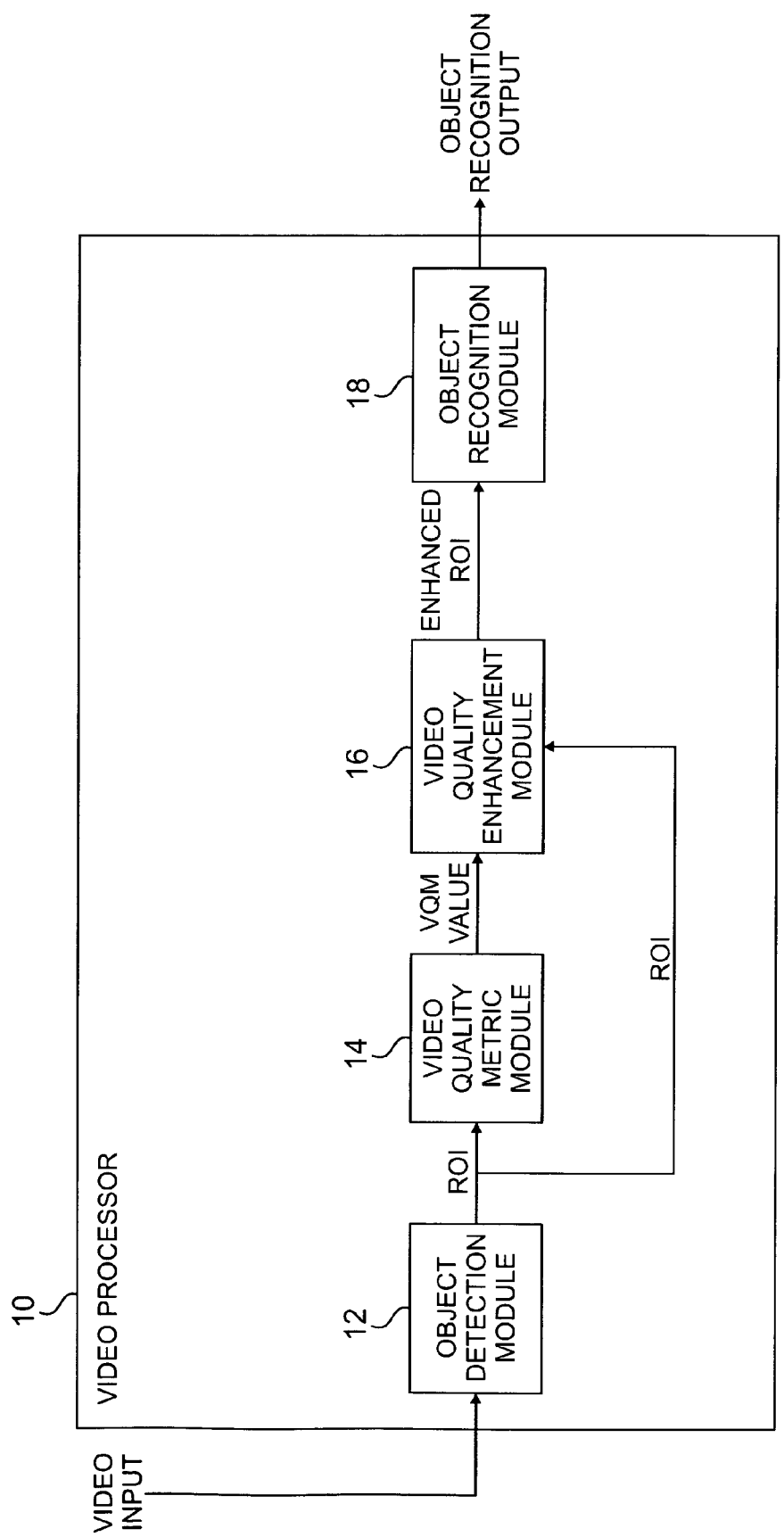
FIG. 1 is a block diagram of a video processor and software modules employed by the video processor to analyze image data according to an embodiment of the present invention.

FIG. 1 is a block diagram of a video processor and software modules employed by the video processor to analyze image data according to an embodiment of the present invention. Video processor 10 includes a plurality of modules, including object detection module 12, video quality metric module 14, video quality enhancement module 16, and object recognition module 18. The plurality of modules represent a combination of hardware/software capable of providing the functionality described with respect to each module. Video processor 10 may also include local memory for storing image input provided by an external device (e.g., video capture device, image capture device, data storage device, etc.) as well as for storing various values calculated as part of the analysis of the image. In addition, the image input may be original image data (i.e., unenhanced) or may be video data that has already been globally enhanced or otherwise converted from an original state to another state.

Object Detection Module

Object detection module 12 selects localized portions of an input image for further analysis. Object detection module 12 may select objects of interest automatically based on the parameters of the application, or may receive input from a user that manually selects localized portions of an input image for additional analysis.

For example, in an application designed to recognize license plates, object detection module 12 may employ an algorithm for automatically identifying and localizing from an image the characteristic rectangular shape of a license plate. Object detection module 12 does not provide object recognition of the localized image (i.e., does not provide analysis recognizing the license plate characters), but rather identifies this localized part of the image as pertinent to subsequent analysis. The localized portion of the image is referred to as the 'region-of-interest'. In facial recognition applications, object detection module 12 identifies and localizes within an image an individual's face for subsequent analysis.

Object detection not provided automatically by object detection module 12 may be provided manually by a user communicating with video processor 10. A user monitoring a particular image would identify objects within the image and manually identify the region of interest that should receive subsequent analysis. In one embodiment, the user may provide the input graphically with the combination of a display unit and input device, in which the user manipulates the input device to select a region of interest associated with the image displayed on the display unit.

Through either automatic or manual object identification, object detection module 12 provides as an output a region of interest (ROI) that defines a localized portion of the received global image.

Video Quality Metric Module

Video quality metric (VQM) module 14 calculates one or more video quality metrics for the ROI provided by object detection module 12. Video quality metrics identify characteristics associated with the quality of the video image. In one embodiment of the present invention, VQM module 14 calculates with respect to a provided ROI sharpness/blurring metrics, contrast metrics, brightness metrics, noise metrics and/or color metrics. These and other video quality metrics are well-known in the art.

A benefit of calculating video quality metrics locally with respect to a particular region of interest is that this approach is computationally less expensive than calculating video quality metrics for the entire image and is localized to a particular ROI, which might have video quality attributes different from those associated with the global image. By calculating video quality metrics associated with an ROI, the video quality deficiency associated only with the ROI is estimated, allowing for more selective enhancement.

For example, an application for recognizing license plates may capture an image at night, global analysis of which would indicate poor contrast and poor brightness. However, the license plate may be illuminated such that the contrast and brightness associated with the selected ROI is relatively good, but motion of the car results in a loss of sharpness or blurring associated only with the ROI. Global VQM estimates would fail to detect the blurring associated with the particular ROI. However, local VQM estimates of the ROI calculated by the present invention will detect the loss of sharpness or blur associated with the selected ROI. As a result, video quality enhancements provided by video quality enhancement module 16 may be selected to cure the local deficiency associated with the selected ROI.

Video Quality Enhancement Module

Video quality enhancement (VQE) module 16 enhances the image defined by the ROI by applying a selected VQE function to the ROI. The VQE function applied to the ROI is selected based on the VQM value calculated by the VQM module 14. In this way, the enhancement provided by VQE module 16 is selected to cure the particular deficiency associated with the ROI. For example, if the calculated VQM value indicates that the ROI is blurred, then VQE module 16 selects a sharpness enhancement or super-resolution function to apply to the ROI. If the calculated VQM value indicates that the contrast associated with the ROI is low, then VQE module 16 selects a contrast enhancement function to apply to the ROI.

In addition, VQE module 16 may also selectively adjust parameters associated with the selected VQE function based on the estimated VQM value. In general, the parameters determine how much 'enhancement' to apply to the ROI. For instance, in response to a VQM value that indicates a highly blurred image, the parameter associated with the sharpness enhancement function or super-resolution function would provide significant sharpness enhancement. In contrast, in response to a VQM value that indicates a slightly blurred image, wherein less sharpness enhancement is required, the parameter associated with the sharpness enhancement function or super-resolution function would provide less significant sharpness enhancement. A benefit of selecting parameters associated with the enhancement function is an optimal amount of enhancement may be provided to a particular ROI. Under-enhancement results in difficulty recognizing objects during the object recognitions step. However, over-enhancement may result in enhancement not only of the image but also of block artifacts (sometimes referred to as coding artifacts if video compression is employed) that tend to increase noise associated with the image, also resulting in difficulty recognizing objects during the object recognition step.

VQE module 16 provides as an output an enhanced version of the ROI, which is provided to object recognition module 18 for object identification analysis.

Object Recognition Module

Object recognition module 18 applies an object recognition algorithm to the enhanced ROI provided by the VQE module 16. A variety of application-specific object recognition algorithms well-known in the prior art may be employed, each of which benefits from enhanced video quality associated with the object to be identified. For instance, in the license plate example described above, applying local sharpness enhancement to the ROI (i.e., the license plate) results in more accurate detection of the license plate characters by object recognition algorithm. Output provided by object recognition module 18 would include outputs indicating the identity of the object, such as the name of person identified by facial recognition software, characters of a license plate, etc.

Figure 2:
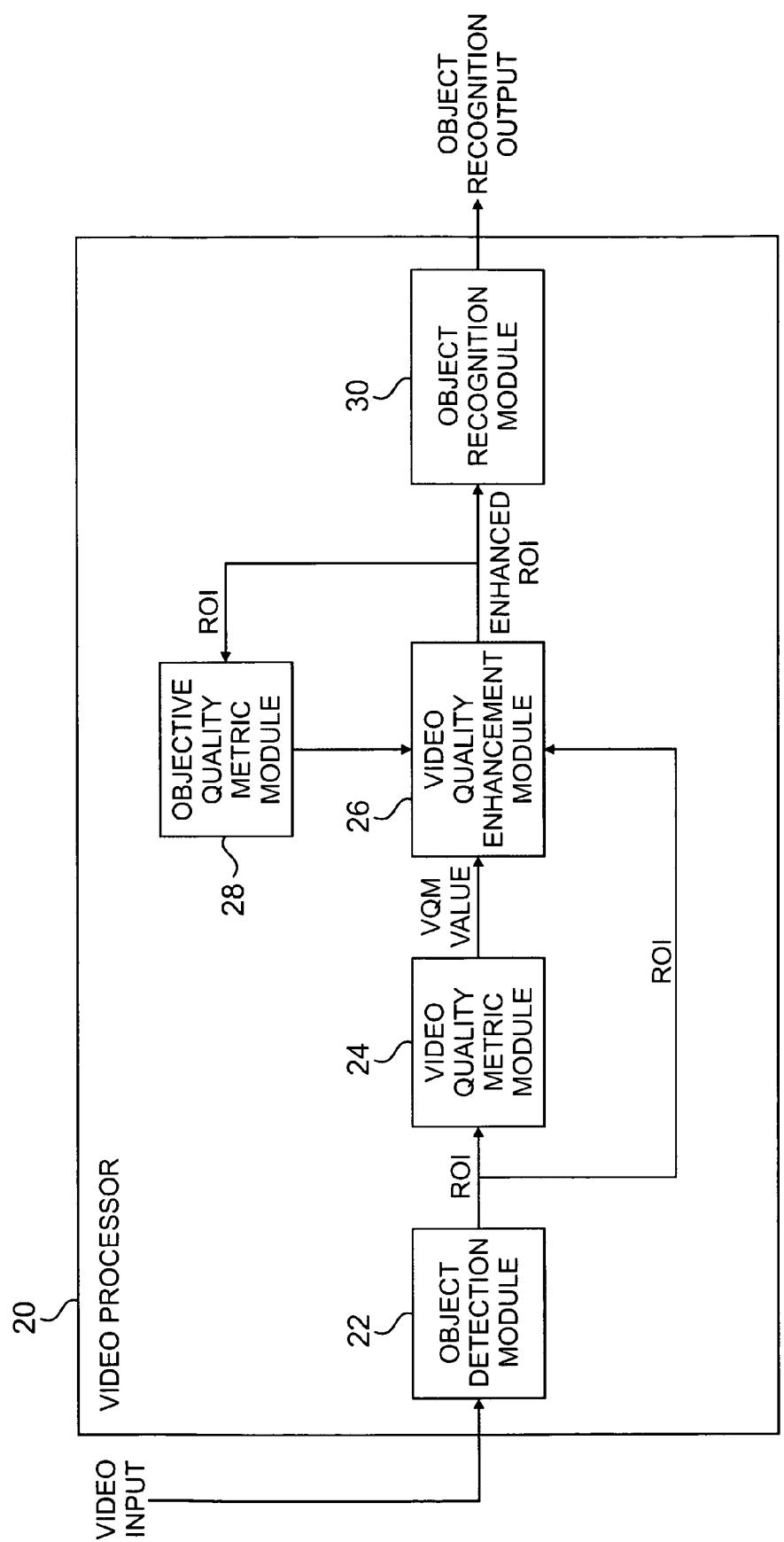
FIG. 2 is a block diagram of a video processor and software modules employed by the video processor to analyze image data according to another embodiment of the present invention.

FIG. 2 is a block diagram of a video processor and software modules employed by the video processor to analyze image data according to another embodiment of the present invention. In this embodiment, video processor 20 includes a plurality of modules, including object detection module 22, video quality metric module 24, video quality enhancement module 26, objective quality metric module 28 and object recognition module 30. Each module describe with respect to FIG. 1 operates in much the same manner in this embodiment. The difference between the embodiments lies in the adjustment of the video quality enhancement parameters. In the embodiment described with respect to FIG. 1, video quality enhancement parameters were adjusted based on the value of the VQM metric provided by VQM module 14. In this embodiment, video quality enhancement parameters are selected through an iterative approach in which a VQE functions are applied to the ROI using a plurality of discrete, parameter values. Because the VQE functions will enhance both the desired signal (representing the object to be recognized) and noise (including Gaussian noise, compression artifacts, etc), the SNR value calculated for each of the discrete parameter values will be maximized (i.e., ratio of signal to noise is maximized) by selection of a particular parameter value.

For each enhanced ROI, objective quality metric module 28 calculates a metric associated with the quality of enhanced ROI. The metric is communicated to VQE module 26, which selects the parameter value that provides the highest quality ROI. In one embodiment, objective quality metric module 28 calculates SNR ratios, and compares SNR values associated with the original ROI with the enhanced ROI. The parameter value that provides the highest quality metric, as measured by objective quality metric module 28, is selected as the parameter value by VQE module 26.

The selected parameter value may be employed in subsequent frames of image data enhanced by video processor 20, or the iterative approach to maximizing the enhancement may be applied to each frame of image data analyzed, although this is computationally more expensive than the former method.

The present invention has been described with respect to modules employed by a video processor. The disclosed invention may therefore be embodied in the form of computer or controller implemented processes and apparatuses for practicing those processes. The present invention can also be embodied in the form of computer program code containing instructions embodied in computer readable medium, such as floppy diskettes, CD-ROMs, hard drives, or any other computer-readable storage medium, wherein, when the computer program code is loaded into and executed by video processor 10, the processor becoming an apparatus for practicing the invention. Video processor 10 may be incorporated with a general purpose processor such as those employed on personal computers, or may be a stand-alone video processor responsible only for analyzing video data.

The present invention may also be embodied in the form of computer program code as a data signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Although the present invention has been described with reference to preferred embodiments, workers skilled in the art will recognize that changes may be made in form and detail without departing from the spirit and scope of the invention.

The invention claimed is:

1. A method of providing video-based object recognition, the method comprising:
   receiving a frame of image data from an image capture device;
   selecting a region-of-interest (ROI) within the received frame;
   calculating a video quality metric (VQM) value for the selected ROI defining quality of the selected ROI;
   selecting a video quality enhancement (VQE) function based on the VQM value calculated with respect to the ROI;
   applying the selected VQE function to the selected ROI to enhance quality of the ROI;
   applying the selected VQE function to the ROI with a plurality of discrete parameter values to generate a plurality of enhanced ROIs, wherein the one or more parameter values define the extent of enhancement provided to the ROI by the selected VQE function;
   calculating an objective metric measuring quality of each of the plurality of enhanced ROIs;
   selecting the parameter value that provided the highest quality objective metric as part of the selected VQE function; and
   applying an object recognition algorithm to the enhanced ROI to identify objects within the ROI.

2. The method of claim 1, wherein selecting the ROI includes:
   applying an object detection algorithm to automatically identify objects of interest within the received image data; and
   selecting the ROI based on the automatically identified objects.

3. The method of claim 1, wherein selecting the ROI includes receiving manual input from a user identifying the ROI.

4. The method of claim 1, wherein calculating the VQM value includes calculating a 20 VQM value selected from a group consisting of: sharpness/blurring metrics, contrast metrics, brightness metrics, noise metrics, color metrics, and combinations thereof.

5. The method of claim 1, wherein selecting the VQE function includes adjusting parameters associated with the selected VQE function based on the calculated VQM value to provide a desired amount of enhancement to the ROI.

6. A video-based object recognition system comprising:
   a video processor, configured to receive a video input, the video processor comprising—
   an object detection module that identifies objects of interest within a frame of image data from the video input, wherein a region of interest (ROI) is defined to include the identified object;
   a video quality metric (VQM) module that calculates one or more VQM values for the selected ROI that defines image quality of the selected ROI;
   a video quality enhancement (VQE) module that selects a VQE function to apply to the defined ROI based on the one or more VQM values calculated with respect to the defined ROI to generate an enhanced ROI;
   an objective quality metric module that calculates a quality value associated with application of enhancements to the selected ROI, wherein the VQE module employs an iterative approach to adjusting parameter values associated with a selected VQE function to select parameters that maximize the quality value calculated by the objective quality metric module, wherein the one or more parameter values define the extent of enhancement provided to the ROI by the selected VQE function; and
   an object recognition module that recognizes objects within the defined ROI based on the enhanced ROI provided by the VQE module.

7. The video-based object recognition system of claim 6, wherein the object detection module receives manual input from a user to define the ROI.

8. The video-based object recognition system of claim 6, wherein the object detection module includes an algorithm for automatically analyzing the frame of image data and identifying objects of interest.

9. The video-based object recognition system of claim 6, wherein the VQM module calculates a VQM value selected from a group consisting of: sharpness/blurring metrics, contrast metrics, brightness metrics, noise metrics, color metrics, and combinations thereof.

10. The video-based object recognition system of claim 6, wherein the VQE module includes one or more parameters associated with each VQE function that are selectively adjusted by the VQE module based on the VQM value calculated by the VQM module, wherein the one or more parameter values define an extent of enhancements provided to the ROI by the selected VQE function.

* * * * *